(12) United States Patent
Rembrand

(10) Patent No.: US 12,533,050 B2
(45) Date of Patent: Jan. 27, 2026

(54) METHOD FOR ELECTROMOTILITY MEASUREMENT OF OUTER HAIR CELLS

(71) Applicant: Raphael Rembrand, Kiryat Tivon (IL)

(72) Inventor: Raphael Rembrand, Kiryat Tivon (IL)

( * ) Notice: Subject to any disclaimer, the term of this patent is extended or adjusted under 35 U.S.C. 154(b) by 374 days.

(21) Appl. No.: 18/263,499

(22) PCT Filed: Jan. 24, 2022

(86) PCT No.: PCT/IL2022/050096
§ 371 (c)(1),
(2) Date: Jul. 28, 2023

(87) PCT Pub. No.: WO2022/168081
PCT Pub. Date: Aug. 11, 2022

(65) Prior Publication Data
US 2024/0081690 A1 Mar. 14, 2024

Related U.S. Application Data

(60) Provisional application No. 63/145,510, filed on Feb. 4, 2021.

(51) Int. Cl.
*A61B 5/12* (2006.01)
*A61B 5/00* (2006.01)

(52) U.S. Cl.
CPC ............ *A61B 5/125* (2013.01); *A61B 5/6816* (2013.01); *A61B 5/6833* (2013.01); *A61B 5/7225* (2013.01); *A61B 2562/043* (2013.01)

(58) Field of Classification Search
CPC ...................................................... A61B 5/125
See application file for complete search history.

(56) References Cited

U.S. PATENT DOCUMENTS 5,776,179 A    7/1998  Ren et al.
2018/0110982 A1*  4/2018  Heasman ............... A61B 5/125

FOREIGN PATENT DOCUMENTS

WO    2019/169440 A1    9/2019

OTHER PUBLICATIONS

International Search Report mailed Jun. 13, 2022 for International Patent Application No. PCT/IL2022/050096 (3 pages).
(Continued)

*Primary Examiner* — Walter L Lindsay, Jr.
*Assistant Examiner* — Andrew V Do
(74) *Attorney, Agent, or Firm* — The Roy Gross Law Firm, LLC; Roy Gross

(57) ABSTRACT

The present invention is an improved method for measuring the electromotile movement of outer hair cells (OHC) which are used in assessing the condition of the OHC and the state of the acoustic path of OHC. The obtained measurement results may be further processed either by comparing them to a standard signal obtained from the electromotile movement of OHC of averaging of a large number of measurements from "normative" people or by comparing them to a model. The measuring method: Stimulated OHC emit acoustic and electromagnetic signals as a result of a stimulus. The method of the invention comprises capturing the emitted electromagnetic signals from the OHC by electrodes placed in close vicinity of an ear of a treated person. The captured signals are transmitted, in the form of a wave file, via electrical connections to a signal processor. The signal processor applies spatial averaging and/or voting algorithm(s) and produces measurement results.

7 Claims, 3 Drawing Sheets

(56) References Cited

OTHER PUBLICATIONS

Written Opinion of The International Searching Authority mailed Jun. 13, 2022 for International Patent Application No. PCT/IL2022/050096 (4 pages).
Ren, T., et al. Extracochlear electrically evoked otoacoustic emissions: a model for in vivo assessment of outer hair cell electromotility. Hearing Research. 1995. vol. 92, Issues 1-2, pp. 178-183.
Ling, T., et al. Full-field interferometric imaging of propagating action potentials. Light: Science & Applications. 2018. vol. 7. No. 107, pp. 1-11.

* cited by examiner

METHOD FOR ELECTROMOTILITY MEASUREMENT OF OUTER HAIR CELLS

FIELD OF THE INVENTION

The present invention relates to a method for measuring the electromotile movement of outer hair cells (OHC). More specifically, the present invention uses electrodes and a signal-processor to measure the electromagnetic activity generated by the electromotility of the OHC.

DEFINITIONS

Outer Hair Cells (OHC)—are located along the length, near the center of the basilar membrane inside the cochlea, the inner ear. OHC are the first responders to auditory stimuli.

OHC electromotility—is a rapid, force generating, length change of the OHC in response to electrical stimulation or a vocal stimulus. Vocal stimuli or electrical pulses either elongate or shorten the cell and sinusoidal electrical stimulation results in mechanical oscillations at acoustic frequencies. The acoustic stimulation that causes length changes in the outer hair cell also results in the generation of an electric field and the output emission of electromagnetic signals.

Cochlear Microphonics (CM)—is a receptor/antenna placed inside the ear canal, of electro-magnetic signals generated primarily by OHC in the cochlea.

Cochlear microphone—sometimes referred to as cochlear implant microphone, is a device used in conjunction with a cochlear implant to capture auditory inputs.
The cochlear microphone definition is included here to avoid confusion between Cochlear Microphonics and Cochlear microphone. The invention is a different implementation Cochlear Microphonics.

Efferents—the nerve bundle conducting neural signals outward from a part or organ. In the context of the present text: conveying neural signals from the central nervous system to the inner ear.

Afferent—bring to or heading towards an organ or part as a nerve or vein (source: Webster's Encyclopedic Unbridged Dictionary, 1989 edition). In the context of the present text: conveying neural signals toward the central nervous system.

Spatial averaging—refers to averaging simultaneously taken measurements from different locations of the same entity from a single person.

Voting algorithm—when more than one measurement, usually and odd number of measurements, exist of the same physical entity (person), all the readings are taken to a vote and the majority of readings is considered the result.

The term "close vicinity of the ear" refers in the text to the area around and behind the earlobe or close to the ear where the electromagnetic signal from the OHC is detectable.

The term "treated person" refers in the text to a person that has his or her OHC electromotility measured.

BACKGROUND OF THE INVENTION

The electromotile activity of the OHC can be induced spontaneously or by audio signals and/or electromagnetic activity stimuli. OHC are the first responders to these stimuli. In addition to that, selected hair cells activity can be suppressed by the brainstem through efferents control (Kemp).

OHC movements are a key component of the cochlear mechanism. They are the first responders to incoming acoustic and/or electromagnetic signals by resonating with the various input frequencies. In addition to detection, they contribute greatly to the sensitivity and discrimination of hearing (Brownell et. al.).

OHC motions measurements are of great importance and widely used. They are commonly used to determine the wellbeing of the inner ear; their mode of function is indicative of outer hair cell integrity. OHC motions measurements are also used for the diagnosis of auditory neuropathy. The obtained measurements may be further processed either by comparing them to a standard signal obtained from the electromotile movement of OHC of averaging of a large number of measurements from "normative" people or by comparing them to a model.

Presently, after the electromotile motions of the OHC are induced they can be recorded and measured using two methods (also referred in the text as "procedures"):

$1^{st}$ procedure: Placing a mechanical microphone in the ear canal which captures the acoustic output of the OHC (presented by Kemp). The microphone produces wave files which, after processing, are indicative of the OHC's response to input signals.

There are two hindering factors with these measurement procedures: (1) the obtained measurement may include acoustic interferences from the surroundings, (2) the obtained response may be ambiguous, depending on the placement of the microphone in the ear canal.

$2^{nd}$ procedure: Placing an antenna in the vicinity of the cochlea (Davis et al), deep in the ear canal so as to capture the emitted electromagnetic output of the OHC. The insertion of the antenna as deep as possible into the ear canal is necessary to be at the closest possible external location to the inner ear so as to enable the best possible reception. The insertion of the antenna as close as possible to the emittance source of the electromagnetic output of the OHC is due to the fact that there are various sources of electromagnetic outputs in the human body (such as brain waves and various neurological activities). The electromagnetic output measurements of the OHC are recorded as wave files in the same as manner as the acoustic output of the OHC which, after processing, are indicative of the OHC's response to input signals.

The Cochlear Microphonics (CM) measurements raises two deficiency issues: (1) A single antenna eliminates the possibility of localizing the exact source of the electromagnetic waves. (2) As mentioned, the use of CM for capturing the electromagnetic output of the OHC requires the insertion of an antenna deep inside the ear canal, all the way to the ear drum, thus, the procedure is invasive, causes discomfort and may endanger the integrity of the ear drum.

To overcome the mentioned shortcoming in the $1^{st}$ and $2^{nd}$ procedures regarding OHC movement measurements, the present invention is introduced. In the present invention, the electromagnetic field produced by the OHC's electromotility is measured by a procedure that replaces the antenna with external electrodes.

The invention is a method for measuring the electromotile motions of the OHC of a person, in which at least three electrodes are placed in close vicinity to the ear, outside of the ear canal. The use of at least three electrodes enables pin-pointing the relevant electromagnetic output OHC waves in the ear. No insertion of an antenna into the ear canal is required.

In the invention, the electromagnetic emitted output signals are "captured" by the plurality of electrodes which transmit the signals in the form of a wave file, to a digital signal processor which integrates and processes the data.

The hindering issues associated with measuring by procedure No. 1 are resolved by the fact that the measurement includes only OHC movements with no other acoustic interferences and that the placement of the electrodes is external which allows for exact positioning relative to the ear.

The hindering issues associated with measuring by procedure No. 2 are resolved by using several electrodes that allows for localization of the OHC input signal and by eliminating the need for deep ear-insertion of an antenna.

REFERENCES

1. Kemp, D. T. "Stimulated Acoustic Emissions from within the Human Auditory System", Journal of the Acoustic Society of America, 1978 64: 1386-91
2. Brownell W E, Bader C R, Bertrand D, Ribaupierre Y D. Evoked mechanical responses of isolated cochlear outer hair cells. Science. 1985; 227:194-196.
3. Davis H., Derbyshire A. J., Lurie M. H. & Saul L. J. 1934 The electric response of the cochlea Amer. J. Physiol. 107, 311-332.

SUMMARY OF THE INVENTION

The present standard acoustic measurement is useful in assessing the condition of the outer hair cells (OHC) and the state of the acoustic path from the OHC. As previously explained, the present standard measurements methods have drawbacks of interferences and preciseness.

To overcome the drawbacks, the invention is a method for direct electromagnetic measurements of OHC activities. A plurality of electrodes connected to electrical wires are placed in the vicinity of the ear of a treated person. The electrodes, via the wires, transmit the electromagnetic measurements to a signal processor as wave files. The signal processor applies spatial averaging or voting algorithms or both, to obtain a reliable measurement from electromagnetic signals and to produce measurement results.

The stages of the signals processing in implementing of the method:

1) A stimulus, vocal and/or electromagnetic is introduced to the OHC.
2) As a result, the OHC resonate, produce and emit electromagnetic signals,
3) The electromagnetic signals are "captured" by the at least three electrodes placed in the vicinity of the ear.
4) Through the connecting wires, the signals from the electrodes are transmitted as wave files to the processing unit.
5) The processing unit implements voting algorithm and/or spatial averaging. Its output measurement results signals are indicative of the OHCs' movements The obtained measurement results signals may be further processed by a signal processor either by comparing them to a standard signal obtained from the electromotile movement of OHC of averaging of a large number of measurements of wave signals from "normative" people or by comparing them to a model.

BRIEF DESCRIPTION OF THE DRAWINGS

In order to better understand the present invention, and appreciate its practical applications, the following Figures are provided and referenced hereafter. It should be noted that the Figures are given as examples only and in no way limit the scope of the invention. Like components are denoted by like reference numerals.

DETAILED DESCRIPTION OF PREFERRED EMBODIMENTS

Figure 1:
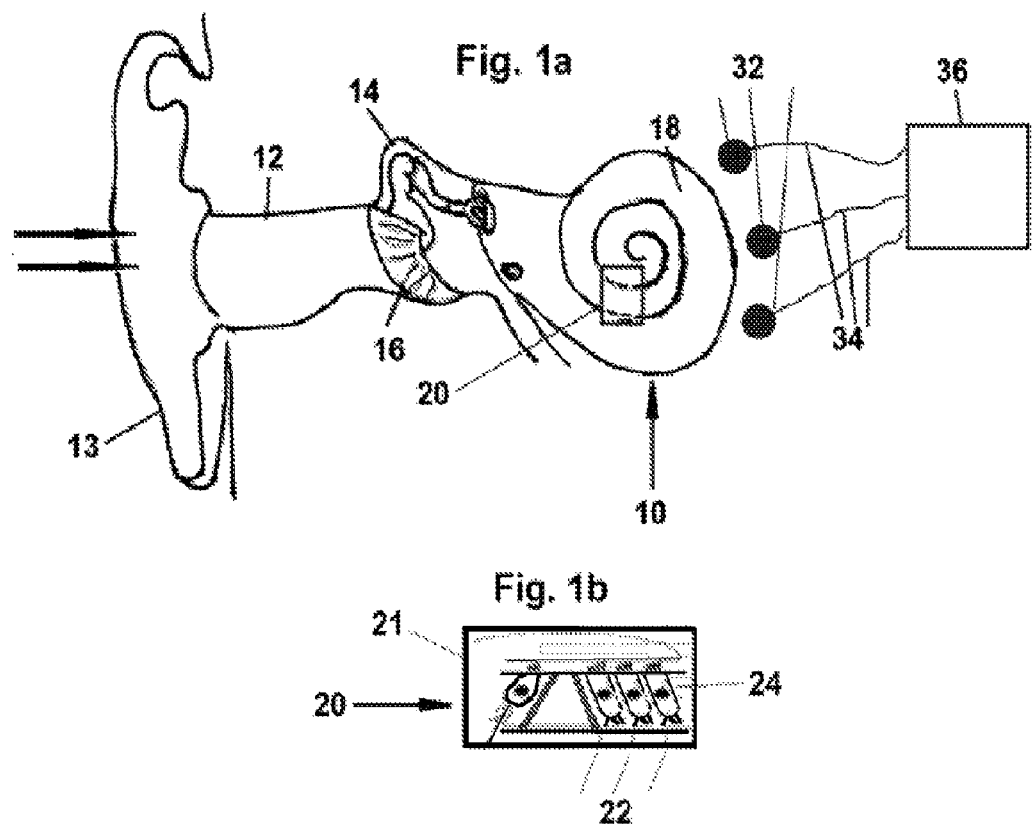
FIG. 1a is a schematic illustration of the physiological components of an ear and the components required for implementing the method for measuring the electromotile movement of outer hair cells (OHC).
FIG. 1b is an enlarged segment of the physiological components of an ear shown in FIG. 1a, illustrating a cross section of the cochlea.

In order to explain the invention of the method for measuring the electromotile movement of outer hair cells (OHC) the physiological components of an ear and the components required for implementing the method for measuring the electromotile movement of OHC are illustrated in FIG. 1.

The physiological components of the ear (10, shown in a crosscut, are illustrated in FIG. 1:
the earlobe (13), the ear canal, (12) ossicles, (14) ear drum, (18) cochlea, (20), a section of the cochlea illustrated in FIG. 1b (20).

The components required for implementing the method of measurements the electromotile movement of OHC: acoustic stimulus (30), electrodes (32), connecting wires (34) and a processing unit (36).

FIG. 1b is an enlarged section (20) of the cochlea (18) illustrated in FIG. 1a. The Fig. illustrates the placement of the efferents (22) and outer hair cells (24) in the cochlea (18).

Figure 2:
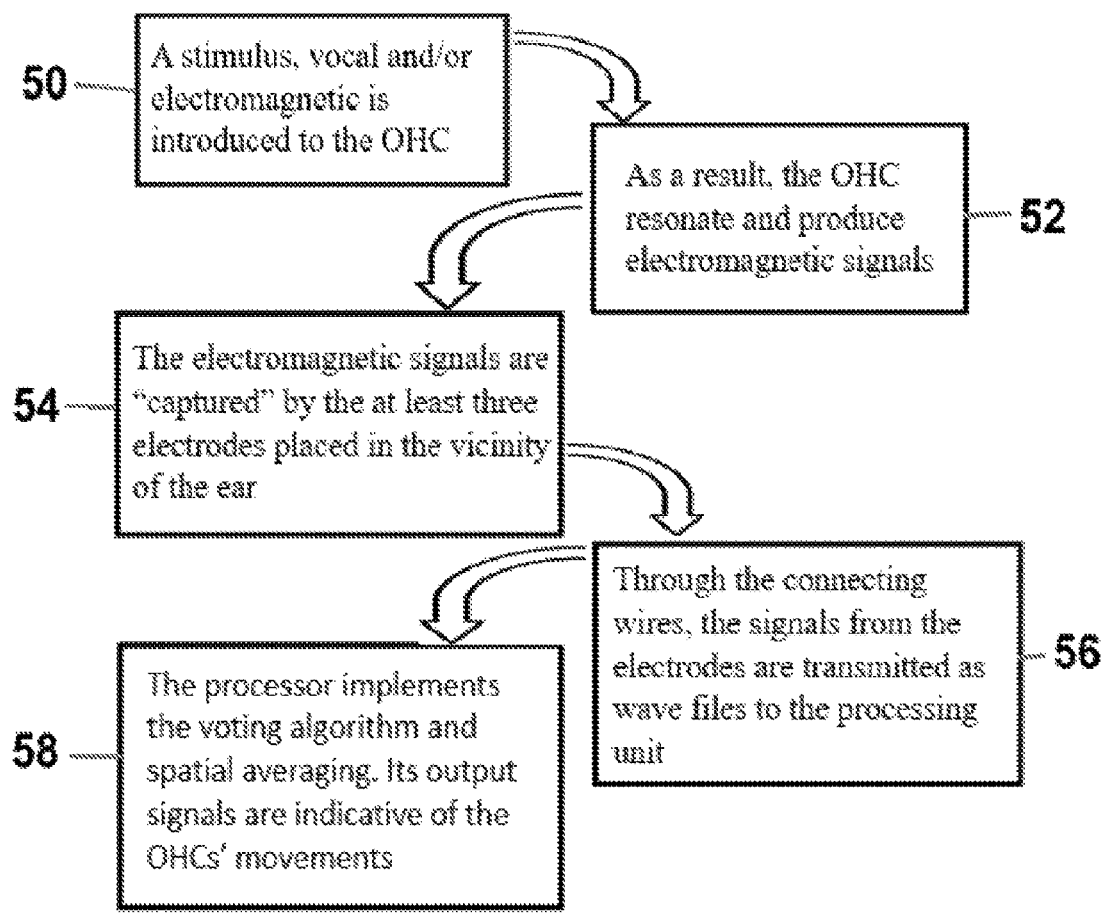
FIG. 2 is a flowchart illustrating the path in which an acoustic signal is processed to produce signals that are inductive of the outer hair cells movement in accordance with the method of the invention.

FIG. 2 is a flow chart illustrating the signal processing stages in measuring the electromotile movement of OHC in accordance with the method of the invention:
The stages, numbered (50) to (58) are:
(50) a stimulus, vocal and/or electromagnetic is introduced to the OHC (number (24) in FIG. 1a),
(52) as a result, the OHC resonate, produce and emit electromagnetic signals (number (24) in FIG. 1a),
(54) the electromagnetic signals are "captured" by at least 3 electrodes placed in the vicinity of the ear (numbers (32) in FIG. 1a),
(56) Through the connecting wires the signals from the electrodes are transmitted to a processing unit (numbers (34) and (36) in FIG. 1a),
(58) The processing unit (36) implements filtering the voting algorithm and/or spatial averaging on the signals from the electrodes and produces a wave signal that is indicative in determining the condition of the OHC and the state of the acoustic path from the OHC of an individual in which the OHC electromotility was measured.

Two possible embodiments of placing the electrodes for measuring the electromotile movement of OHC in a person are presently described.

Figure 3:
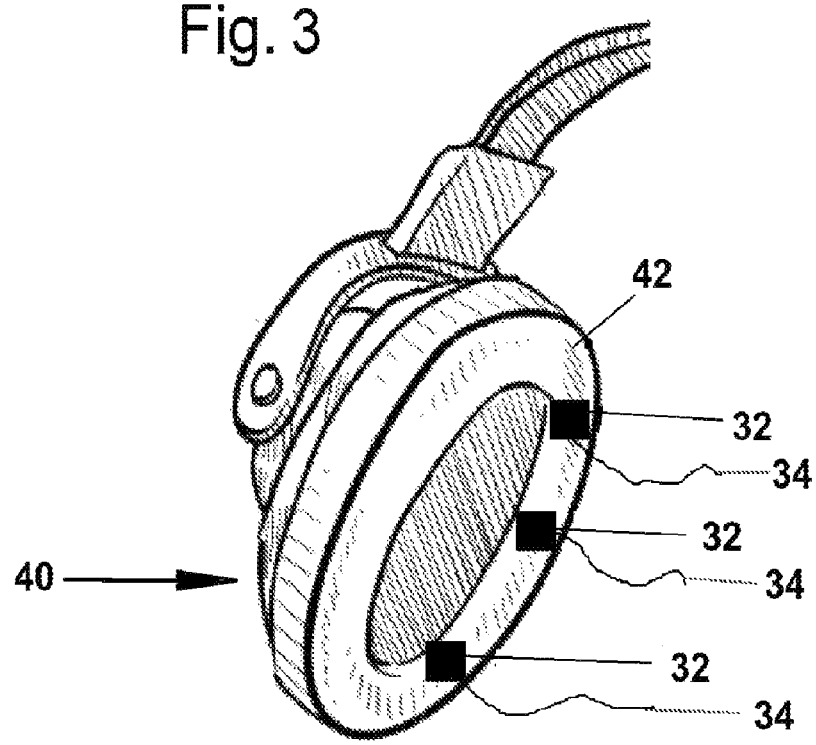
FIG. 3 is a schematic illustration of a cushioned earcup of an acoustic headset with electrodes positioned in various locations in the cushion so as to be in contact with the skin of the person wearing the headset.

Embodiment No. 1 illustrated in FIG. 3: Skin-contact-electrodes (32) having a smooth surface and made of, but not limited to, a metallic material, are fixated in the rim of a cushion (42) of an audio headset (40) that surrounds the earlobe (13) of the ear (10) of a person and closes an air-volume in a close vicinity of the ear canal. Each of the electrodes has a wire (34) that connects a signal-processor (36) integrates the signals from the electrodes and produces output data that is used for indicating the physiological wellbeing of the inner ear of a treated person.

Figure 4:
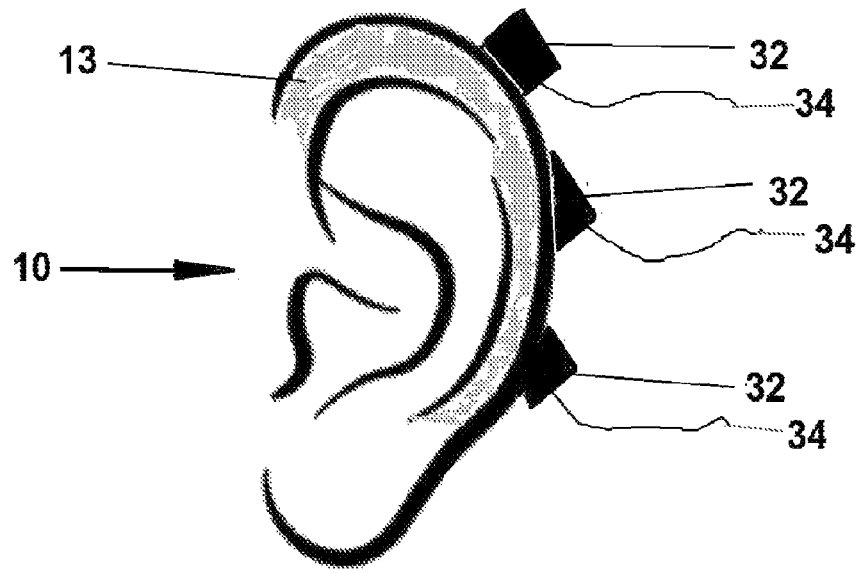
FIG. 4 is a schematic illustration of a person's ear with electrodes connected to the skin behind the ear of the person.

Embodiment number 2 illustrated in FIG. 4: Skin-contact-electrodes (32) are positioned and fixated to the skin area behind the earlobe (13) of a person being treated. The electrodes in the embodiment are such (but not limited to) as used in EKG monitoring. Due to the small skin areas involved, commercially available, small size monitoring electrodes (32) are preferably used. Each of the electrodes has a wire (32) that connects it to a signal-processor (36). The signal processor integrates the signals from the electrodes and produces an output measuring data that that can be further processed and used for indicating the physiological wellbeing of the inner ear of a treated person.

The reversible fixation of the electrodes (32) to the skin of a treated person can be done by the use of skin-connecting skin-sticking-substances, as used for connecting electrodes as used in EKG procedures. Alternatively, the reversible placement and fixation of the electrodes (32) to the vicinity of an ear of a treated person can be done by physical means such as, but not limited to, a wire or string that support connected electrodes and is wrapped around the earlobe or a bow or bows that is/are placed around the head of the treated person and supports (connected to it) electrodes.

It is made clear that in addition to the two presented embodiments other configurations of reversibly positioning the electrodes (32 in the near vicinity of the ear of a treated person are possible, including possibilities in which the electrodes are kept in the close vicinity of the ear without being in contact with the skin of the treated person.

I claim:

1. A method for measuring outer hair cells (OHC) electromotility in which:
   emitted electromagnetic signals from the OHC of a person's ear are captured by electrodes placed in close vicinity of said ear,
   said captured signals are transmitted from said electrodes, via electrical connections, to a signal processing unit,
   said signal processing unit applies a filtering, voting and/or spatial averaging algorithm(s) and produces measurement results.

2. A method for measuring outer hair cells (OHC) electromotility of claim 1, wherein, the implementation of said method comprises:
   a stimulus,
   at least 3 electrodes per ear of a treated person,
   each of said electrodes having an electrical wire connection,
   a signal recording and processing unit able to implement a voting algorithm and/or spatial averaging calculations,
   said electrodes are connected by said wires to said signal recording and processing unit,
   wherein,
   said electrodes are reversibly placed in close vicinity of the ear of said treated person,
   said OHC electromotility signals emitted as the result of the said stimuli, are captured by said electrodes and transmitted via said wire connections to said signal recording and processing unit,
   said signal recording and processing unit implements voting algorithm and/or spatial averaging calculations on said captured OHC electromotility signals to produce measurement results.

3. The stimulus of the method for measuring OHC electromotility of claim 2
   wherein, the stimulus is an electromagnetic signal.

4. The stimulus of the method for measuring OHC electromotility of claim 2,
   wherein, the stimulus is an audio (acoustic) signal.

5. The electrodes reversibly placed and fixated in close vicinity of the ear of said treated person in the method for measuring OHC electromotility of claim 2, wherein said electrodes are placed and fixated on the skin of said treated person by a skin-sticking-substance.

6. The electrodes reversibly placed and fixated in close vicinity of the ear of said treated person in the method for measuring OHC electromotility of claim 2, wherein said electrodes are connected to a bow that presses said electrodes towards an earlobe of the treated person.

7. The electrodes reversibly placed and fixated in close vicinity of the ear of said treated person in the method for measuring OHC electromotility of claim 2, wherein said electrodes are not in direct contact with the skin.

\* \* \* \* \*